June 11, 1946.  F. L. HAUSHALTER  2,402,042
TRACK FOR VEHICLES
Filed Feb. 3, 1943   2 Sheets-Sheet 1
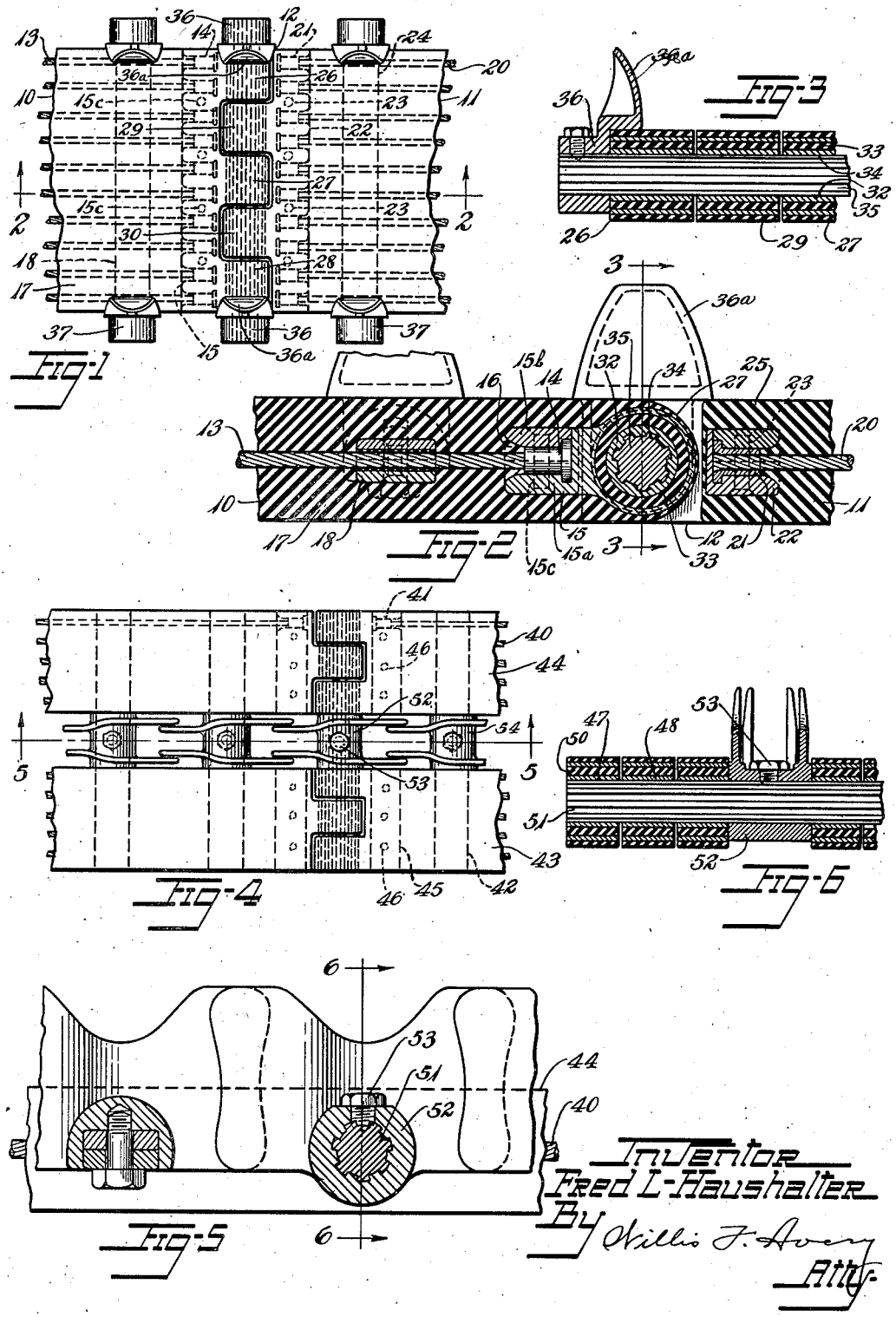

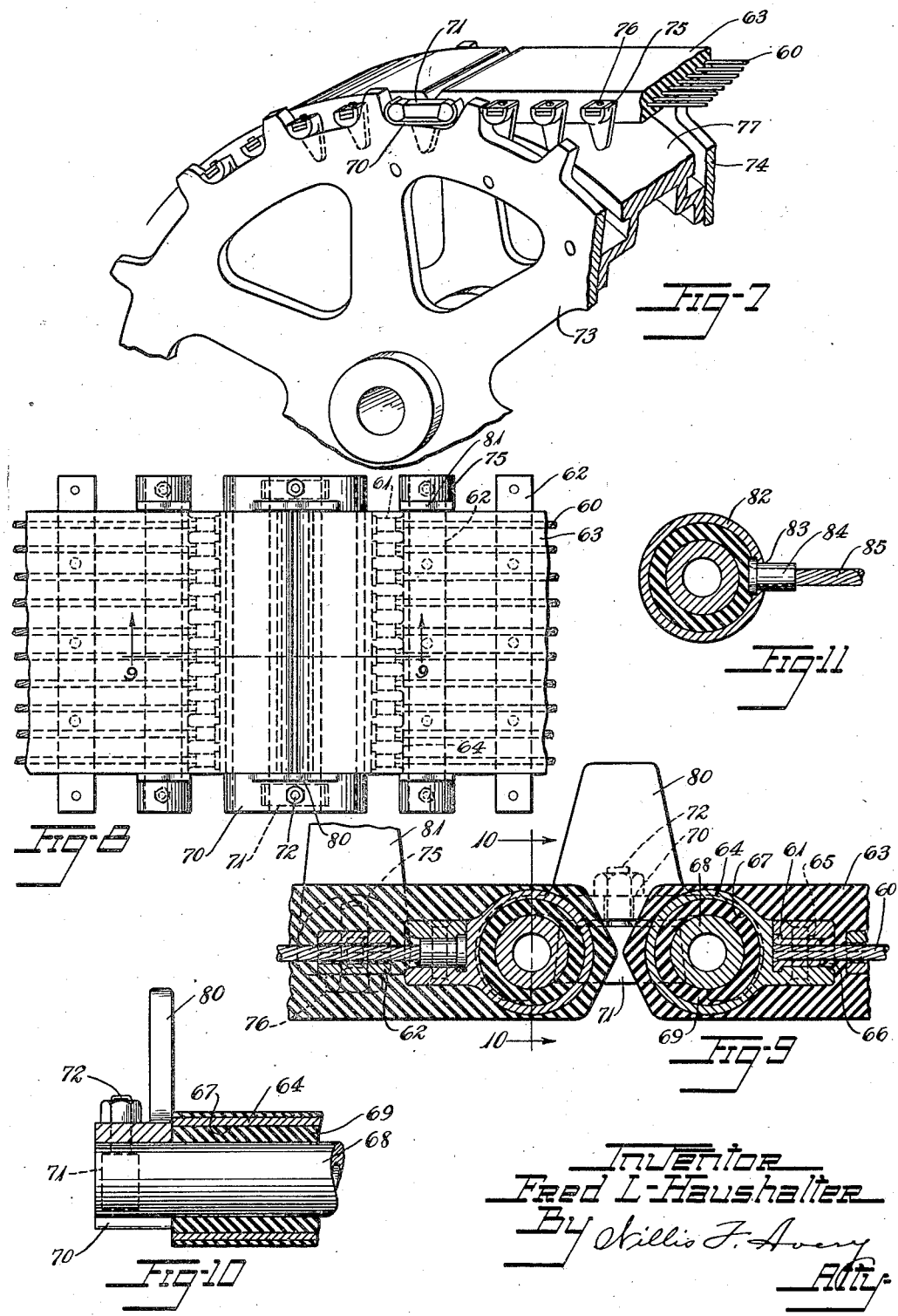

Patented June 11, 1946

2,402,042

UNITED STATES PATENT OFFICE 2,402,042

TRACK FOR VEHICLES

Fred L. Haushalter, Akron, Ohio, assignor to The B. F. Goodrich Company, New York, N. Y., a corporation of New York Application February 3, 1943, Serial No. 474,547

7 Claims. (Cl. 305—10)

1

This invention relates to tracks for self-laying track-type vehicles and is especially useful in tracks having ends connected to each other.

In the manufacture and use of flexible tracks for self-laying track-type vehicles it has been found desirable to construct the track in one or more replaceable sections, although extensive continuity of cables or other tension elements in the track is also desirable. The sectional construction requires connecting means for coupling the ends to each other, but such connections as have been heretofore proposed have been objectionably stiff and unyielding and have interfered with the uniformly flexible operation of the track.

The principal objects of the invention are to provide for extensive flexibility of the track and at the same time to provide for detachability of adjacent ends, to provide a flexible track of the band or cable reinforcement type with a resilient oscillating joint, to provide close anchorage of flexible tension members at the joint, to provide cushioning of the track load and flexibility at the joint, and to provide for convenience of assembly and dis-assembly of the track.

These and other objects will appear from the following description and the accompanying drawings.

Of the drawings:

Fig. 1 is a plan view of a portion of a flexible track of the side driving, side guiding type constructed in accordance with and embodying the invention, showing the connection between sections, other parts being broken away.

Fig. 2 is a longitudinal cross-sectional view thereof, taken on line 2—2 of Fig. 1.

Fig. 3 is a cross-sectional view thereof, taken on line 3—3 of Fig. 2.

Fig. 4 is a plan view of a flexible track of the center driving, center guiding type, also constructed in accordance with and embodying the invention.

Fig. 5 is a longitudinal section thereof taken on line 5—5 of Fig 4.

Fig. 6 is a cross-section thereof taken on line 6—6 of Fig. 5, parts being broken away.

Fig. 7 is a perspective view of a portion of a driving wheel and a flexible sectional track embodying the invention in a modified form showing a track of the side driving, side guiding type, parts being broken away.

Fig. 8 is a plan view of a portion of the track thereof.

Fig. 9 is a cross-sectional view of the track, taken on line 9—9 of Fig. 8.

Fig. 10 is a longitudinal sectional view taken

2 on line 10—10 of Fig. 9, parts being broken away.

Fig. 11 is a longitudinal sectional view of a track at a connecting joint showing a modification.

As shown in the illustrative embodiments of the invention, the track comprises flexible sections or is otherwise open-ended and has a reinforcement of flexible, longitudinally-extending tension members preferably embedded in a resilient body of rubber or other rubber-like material, and the ends of the tension members are secured to resilient elements of rubber or other rubber-like material in a manner to provide a flexible and resilient connection of the track ends preferably through torsional action of said resilient elements.

Referring to the drawings, and first to the embodiment of Figs. 1 to 3, adjoining flexible track sections 10 and 11 are removably connected to each other at 12. Section 10 has a plurality of flexible tension members 13, such as metallic cables, arranged in spaced-apart relation. The ends of the cables are secured within ferrules 14, as by welding, brazing, or wedging. At the end of the section a metallic hinge member 15 is provided. This member is formed with spaced sockets 16 for receiving and retaining the ferrules and may be made of complementary metal bars 15a, 15b having semi-cylindrical grooves for defining the sockets and held together by means such as rivets 15c. A body 17 of resilient rubber-like material surrounds the tension members and the hinge members 15 and is bonded to them. Cross-bars 18 for holding the tension members in spaced-apart relation may be secured to the tension members at spaced-apart intervals therealong between the hinge members, which are located at each end of the section, and are also embedded in the body of rubber-like material with their ends projecting at the sides of the track.

The track section 11 also has longitudinal tension members 20 secured to ferrules 21 which are anchored in a hinge member 22. Hinge member 22 is formed of complementary metal bars held together by rivets 23. Hinge member 22, tension members 20 and cross-bars 24, similar to cross-bars 18, are surrounded by a resilient body 25 of rubber-like material and bonded thereto.

The track sections 10, 11 are deeply notched at their meeting ends to form intercalated knuckles 26, 27, 28 on section 10 and 29, 30 on section 11, each knuckle comprising a sleeve-like metallic extension of the hinge member surrounded by the resilient rubber-like material, the sleeve-like metallic portions being formed with aligned apertures having their axes coinciding.

Within each aperture and spaced radially therefrom is a metal bushing 32, and a resilient bushing 33 of rubber-like material fills the space between the bushing 32 and the aperture of the knuckle, and is bonded by vulcanization to the bushing and to the hinge member. Bushings 32 are formed with aligned keys 34 on their inner faces. A hinge pin 35 is formed with cooperating key-ways and is removably mounted within the aligned bores of the bushings 32.

For guiding and driving the track, sprocket-engaging members 36 having integral wheel engaging guide members 36a are secured to the ends of the coupling pin, and similar driving and guiding members 37 are secured to the projecting ends of the cross-bars 18, 24. The cross-bars are arranged so that the spacing thereof with relation to the coupling pins is proper for engagement with a driving sprocket.

In the form of the invention shown in Figs. 4 to 6, each track section has two sets of spaced-apart longitudinally-extending tension elements 40, having ferrules 41 secured to their ends, the sets of tension members are spaced laterally from each other to provide for center driving. Cross-bars 42 are secured to the tension members at regular intervals along the section. Bodies 43, 44 of resilient rubber-like material enclose the sets of tension members respectively and portions of the cross-bars, leaving the cross-bars exposed between the bodies.

At each end of a track section, a hinge member 45 of metal made in complementary bars held together by rivets 46 is provided for each set of tension members, and formed with recesses for holding the ferrules 41. The ends of the rubber bodies 43, 44 and their respective hinge members are deeply notched to provide knuckles which have aligned cross-apertures. Metal bushings 47, 48 of length equal to the width of the rubber bodies are located within the cross-apertures and held in spaced relation thereto by bushings 50 of rubber-like material, preferably vulcanized thereto. A connecting pin 51 removably extends through the metal bushings 47, 48 and is keyed thereto. Between the rubber bodies, a driving and guiding member 52 is secured to the connecting pin by being keyed thereto and also by a set screw 53 which locks the connecting pin against end movement. Other similar guiding and driving members 54 are secured to the cross-bars 42.

In the form of the invention illustrated in Figs. 7 to 10, each track section has a plurality of longitudinally extending tension members 60 in laterally spaced-apart relation and each having a ferrule 61 secured to each end thereof. Cross-bars 62 comprising complementary bar elements are secured to each other at intervals along the band of tension members and extend at the sides of a band 63 of rubber-like material which encloses the tension members. At the ends of the track section, a hinge member 64 of metal formed of complementary parts secured together by rivets 65 is provided with recesses 66 for receiving the ferrules 61 and also with a bore 67, extending crosswise of the track, in which a connecting bar 68 is retained. A torsion bushing 69 of resilient rubber-like material extends about the bar 68 within the bore 67 and is secured to the bar and to the hinge member by a bond of vulcanization. The ends of the connecting bars extend at the sides of the track beyond the rubber-like body. A connecting link 70 engages about the ends of connecting bars of adjacent sections at each side of the track, and a wedge member 71 engages between the ends of the bars to clamp them thereagainst, there being flats on the bars for engaging the wedge member. A bolt 72 secures the wedge in place. The outside surface of links 70 are adapted to engage the sprockets 73, 74 for driving the track. Other driving members 75 are secured to the ends of the cross-bars 62 by bolts 76. A pulley surface 77 may be located between the sprockets and supported thereby or by the shaft on which they are secured for supporting the track body 63. Connecting links 70 are formed with guide flanges 80 and driving members 75 are also provided with guide flanges 81 for engaging over the sides of the pulley for guiding the track.

In any of the forms of the invention hereinabove described, the track may be of one section with its ends connected to each other or may be of a number of connected sections which may be replaced when damaged. The torsion bushings about the connecting pins provide extensive flexibility at the joint by virtue of the flexure permitted by the bushing in cylindrical shear stress, and with the flexible tension members and body of resilient material provide a track of high flexibility substantially throughout its length. At the same time, the bushings do not objectionably lessen the effectiveness of the tension bands in maintaining the pitch length of the track inasmuch as the compressive displacement of the rubber of the bushing in its radial direction is relatively small under track tension.

As shown in Fig. 11 even greater flexibility is made possible by use of a bushing 82 to replace the hinge members 22 of Figs. 1 to 3 or 45 of Figs. 4 to 6 or 64 of Figs. 7 to 10 and providing openings 83 therethrough for retaining the ferrules 84 to which the cables 85 are secured. The bushings 82, ferrules 84, and cables 85 of this form are embedded in a body of rubber-like material, as in the other forms of the invention.

Variations may be made without departing from the scope of the invention as it is defined by the following claims:

I claim:

1. A track for self-laying track type vehicles, said track comprising a flexible band having an end, said band including a flexible tension structure and connecting means secured to said flexible tension structure for connecting said end of the band to another band end, said connecting means comprising a body of resilient rubber-like material mounted to resist flexure of the connection by shear stress of said material and a housing for said body of rubber-like material to which housing said flexible tension structure is attached in proximity to said rubber-like material for substantial flexibility of the track throughout said tension structure and connecting means.

2. A track for self-laying track type vehicles, said track comprising flexible band sections of flexible tension members, hinge members secured to the ends of the tension members, a flexible body of rubber-like material enclosing said tension members and said hinge members and means for connecting adjacent bands to each other, said means comprising a bushing of rubber-like material permitting flexure of the hinge through torsional action of said material, and said hinge members comprising a sleeve for housing said bushing in proximity to the secured ends of the flexible tension members for substantial flexibility of the track throughout said tension members and hinge.

3. A track for self-laying track type vehicles, said track comprising flexible band sections of flexible tension members, hinge members secured to the ends of said tension members, and bodies of rubber-like material surrounding said tension members and continuing over said hinge members, said sections having knuckles extending into said hinge members and arranged in intercalated relation, a connecting pin extending through apertures in said knuckles, and resilient bushings between said connecting pin and said hinge members within said knuckles.

4. A track for self-laying track type vehicles, said track comprising flexible track sections of resilient rubber-like material having their ends notched to engage each other in intercalated relation, flexible tension-resisting means in said sections, a connecting pin extending crosswise through the notched portions, a torsion bushing of resilient material surrounding said pin within a track section, and a sleeve enclosing said bushing and secured to said tension means in proximity to said resilient material for substantial flexibility of the track throughout said tension means and said bushing.

5. In a track for self-laying track type vehicles, an open-ended flexible band including a flexible tension-resisting structure, and connecting means at an end of said band, said means comprising an outer member, means for securing an end of said flexible tension-resisting structure to said outer member, an inner element within said outer member, means for connecting said inner element to another band end, a body of rubber-like material mounted between said outer member and inner element to resist relative flexing movement of the connection by shear stress of said material, and a body of rubber-like material enclosing said tension-resisting structure and said outer member.

6. In a track for self-laying track type vehicles, an open-ended flexible band including a plurality of cable reaches laterally spaced from each other, and connecting means at an end of the band, said means comprising ferrules secured to the ends of the cable reaches, an outer sleeve structure having sockets for retaining said ferrules, an inner element within said sleeve structure, means for connecting said inner element to another band end, a body of rubber-like material mounted between said outer sleeve structure and said inner element to resist relative flexing movement of the connection by shear stress of said material, and a body of rubber-like material enclosing said cable reaches and extending over said outer sleeve structure.

7. A flexible track section for a self-laying track, said track section comprising a body of resilient rubber-like material, a tension-resisting cable structure embedded therein and terminating short of an end of said body, a sleeve structure embedded in said body at said end, an inner member in said sleeve structure, and a body of resilient rubber-like material between said member and sleeve structure and cushioning relative rotation thereof, said cable structure being secured to said sleeve structure in proximity to the rubber-like material in the latter for substantial flexibility of the track section in the region of said cable structure and also in the region of said end.

FRED L. HAUSHALTER.